United States Patent
Aphale et al.

(10) Patent No.: US 9,745,900 B2
(45) Date of Patent: Aug. 29, 2017

(54) METHODS OF DETERMINING SENSOR PROBE LOCATION IN A CLOSED LOOP EMISSIONS CONTROL SYSTEM

(71) Applicant: General Electric Company, Schenectady, NY (US)

(72) Inventors: Siddharth Aphale, Houston, TX (US); Scott Alan Kopcho, Greenville, SC (US); Daniel Robert Tegel, Greenville, SC (US); Aarron Dell Johansen, Greenville, SC (US)

(73) Assignee: General Electric Company, Schenectady, NY (US)

( * ) Notice: Subject to any disclaimer, the term of this patent is extended or adjusted under 35 U.S.C. 154(b) by 529 days.

(21) Appl. No.: 14/265,658

(22) Filed: Apr. 30, 2014

(65) Prior Publication Data
US 2015/0315953 A1    Nov. 5, 2015

(51) Int. Cl.
| | |
|---|---|
| *F02C 9/00* | (2006.01) |
| *F01N 13/00* | (2010.01) |
| *G01K 3/06* | (2006.01) |
| *F01D 21/12* | (2006.01) |
| *F01D 21/14* | (2006.01) |
| *F01N 9/00* | (2006.01) |
| *G01K 13/02* | (2006.01) |

(52) U.S. Cl.
CPC ............... *F02C 9/00* (2013.01); *F01D 21/12* (2013.01); *F01D 21/14* (2013.01); *F01N 9/00* (2013.01); *F01N 13/008* (2013.01); *G01K 3/06* (2013.01); *G01K 13/02* (2013.01); *F01N 2900/1402* (2013.01); *F01N 2900/1404* (2013.01); *F05D 2220/32* (2013.01); *F05D 2230/60* (2013.01); *F05D 2260/83* (2013.01); *F05D 2270/08* (2013.01); *G01K 2205/04* (2013.01); *G01K 2213/00* (2013.01); *Y02T 10/47* (2013.01)

(58) Field of Classification Search
CPC .......... F02D 41/1438; F02C 9/00; F02C 9/28; F02C 9/26; F01D 21/12; F01D 21/14; F01N 9/00; F01N 13/008; G01K 3/06; G01K 13/02; F23N 5/003; F23N 2040/20; F05D 2270/083; F05D 2270/303; G01M 15/14
USPC ...... 60/772, 39.5, 39.281, 39.282, 794, 795, 60/39.3
See application file for complete search history.

(56) References Cited

U.S. PATENT DOCUMENTS

| | | | |
|---|---|---|---|
| 7,492,980 B2 | 2/2009 | McCarthy et al. | |
| 8,151,571 B2 | 4/2012 | Maly et al. | |
| 2010/0292906 A1* | 11/2010 | Girouard | F01D 17/02 701/100 |
| 2010/0300062 A1* | 12/2010 | Ewens | F01D 17/08 60/39.24 |
| 2011/0067408 A1 | 3/2011 | Maly et al. | |

(Continued)

*Primary Examiner* — Christopher Demeree
(74) *Attorney, Agent, or Firm* — Armstrong Teasdale LLP

(57) ABSTRACT

Methods of determining a desired sensor probe location in a closed loop emissions control (CLEC) system of a gas turbine engine are provided. One method includes determining, at different locations, a plurality of temperature contour profiles for exhaust flowing through an exhaust duct, selecting an emissions component entrained in the exhaust to be measured, and determining a desired sensor probe installation location based on the emissions component to be measured and based on the plurality of temperature contour profiles.

20 Claims, 6 Drawing Sheets

(56) References Cited

U.S. PATENT DOCUMENTS

2012/0317990 A1* 12/2012 Krull .................. F23N 5/245
                                                                         60/772

* cited by examiner

METHODS OF DETERMINING SENSOR PROBE LOCATION IN A CLOSED LOOP EMISSIONS CONTROL SYSTEM

BACKGROUND

The field of the present disclosure relates generally to turbine engines and, more specifically, to methods of determining a sensor probe location in a closed loop emissions control (CLEC) system.

At least some known gas turbine engines are used to generate electricity in power plants. Typically, the gas turbine engine includes a turbine compressor that compresses an air flow and a turbine combustor that combines the compressed air with fuel and ignites the mixture to generate combustion gases. As the combustion gases are expanded through a turbine, the turbine is rotated, and a turbine generator coupled via a shaft to the turbine is rotated to generate power. The turbine also generates exhaust gases that are channeled through an axial exhaust duct prior to being discharged through an exhaust stack. To comply with environmental particulate monitoring requirements, for example, at least some gas turbine engines include a CLEC system that continuously monitors the flow of gas emissions through the exhaust duct. More specifically, the CLEC system measures an amount of particulate in the exhaust flow exiting the gas turbine engine.

At least some known CLEC systems include one or more sensor probes (also referred to as "sample extraction probes") that are positioned in the exhaust duct for sensing the amount of particulate in the exhaust flow. To ensure accurate measurements, the sensor probes are located within the exhaust duct in a recirculation zone at a "sweet spot" that represents a well-mixed exhaust flow. Known systems cannot be tuned to have higher sensitivity towards any one particular component of the emissions profile. Additionally, the sweet spot is generally located through a trial and error process until the sweet spot is identified. This may involve time-consuming field validation work during the commissioning of the CLEC system to validate the sweet spot against the continuous emissions monitoring system (CEMS) at the exhaust stack. The CLEC system may induce field variability. As such, the actual measurement variation is a function of variability in ambient conditions, unless the same vendor technology is used at the exhaust stack and at the CLEC system location to cancel out any ambient variation effect.

BRIEF DESCRIPTION

In one embodiment, a method of determining a desired sensor probe location in a closed loop emissions control (CLEC) system of a gas turbine engine is provided. The method includes determining, at different locations, a plurality of temperature contour profiles for exhaust flowing through an exhaust duct, selecting an emissions component entrained in the exhaust to be measured, and determining a desired sensor probe installation location based on the emissions component to be measured and based on the plurality of temperature contour profiles.

In another embodiment, a method of operating a gas turbine engine is provided. The method includes determining, at different locations, a plurality of temperature contour profiles for exhaust flowing through an exhaust duct, the exhaust having at least one emissions component entrained therein and selecting an emissions component entrained in the exhaust to be measured. The method also includes determining a desired sensor probe installation location based on the emissions component to be measured and based on the plurality of temperature contour profiles and adjusting at least one of a loading and operation of the gas turbine engine based on a concentration of the emissions component measured by the sensor probe installed in the desireded sensor probe installation location.

DETAILED DESCRIPTION

Figure 1:
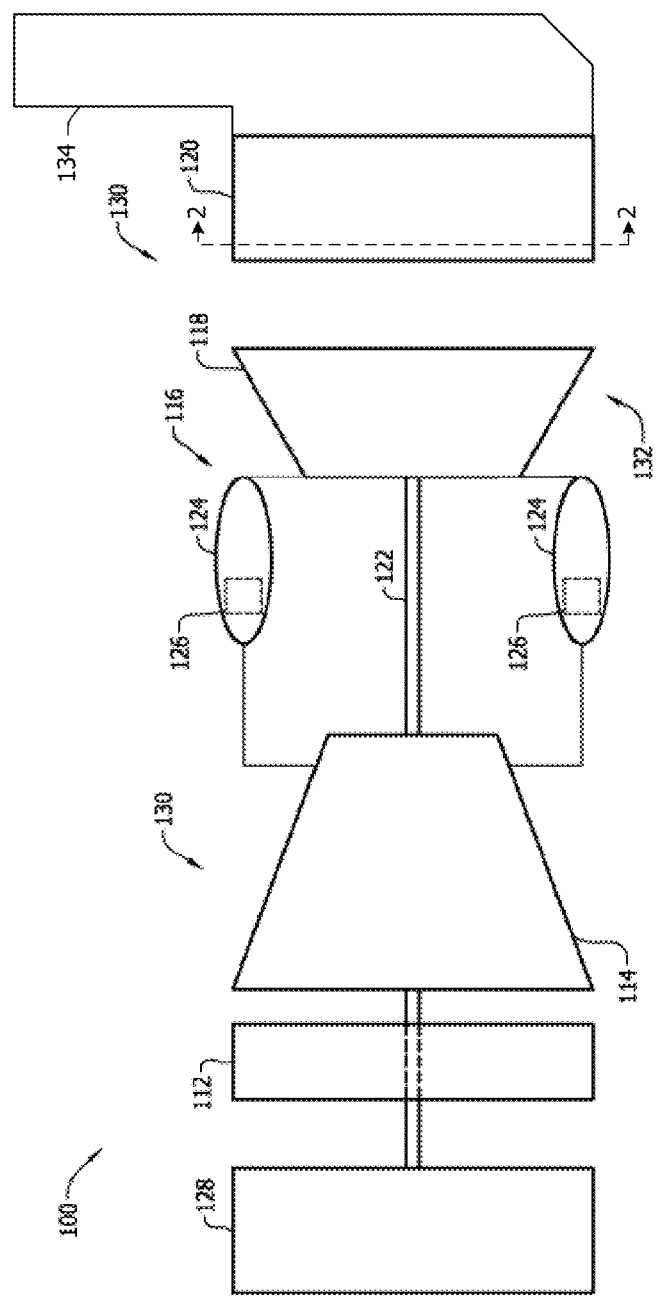
FIG. 1 is a schematic view of an exemplary turbine engine.

FIG. 1 is a schematic view of an exemplary turbine engine 100. More specifically, in the exemplary embodiment turbine engine 100 is a gas turbine engine. While the exemplary embodiment illustrates a gas turbine engine, the present invention is not limited to any one particular engine, and one of ordinary skill in the art will appreciate that the current invention may be used in connection with other turbine engines.

In the exemplary embodiment, turbine engine 100 includes an intake section 112, a compressor section 114 downstream from intake section 112, a combustor section 116 downstream from compressor section 114, a turbine section 118 downstream from combustor section 116, and an exhaust duct 120. Turbine section 118 is coupled to compressor section 114 via a rotor shaft 122. In the exemplary embodiment, combustor section 116 includes a plurality of combustors 124. Combustor section 116 is coupled to compressor section 114 such that each combustor 124 is in flow communication with compressor section 114. A fuel nozzle assembly 126 is coupled within each combustor 124. Turbine section 118 is coupled to compressor section 114 and to a load 128 such as, but not limited to, an electrical generator and/or a mechanical drive application through rotor shaft 122. In the exemplary embodiment, each of compressor section 114 and turbine section 118 includes at least one rotor disk assembly 130 that is coupled to rotor shaft 122 to form a rotor assembly 132.

During operation, intake section 112 channels air towards compressor section 114 wherein the air is compressed to a higher pressure and temperature prior to being discharged towards combustor section 116. The compressed air is mixed with fuel and other fluids provided by each fuel nozzle assembly 126 and then ignited to generate combustion gases that are channeled towards turbine section 118. More specifically, each fuel nozzle assembly 126 injects fuel, such as natural gas and/or fuel oil, air, diluents, and/or inert gases, such as nitrogen gas ($N_2$), into respective combustors 124, and into the air flow. The fuel mixture is ignited to generate high temperature combustion gases that are channeled towards turbine section 118. Turbine section 118 converts the thermal energy from the gas stream to mechanical rotational energy, as the combustion gases impart rotational energy to turbine section 118 and to rotor assembly 132. Exhaust and/or emissions exiting combustor section 116 are routed to an exit stack 134 via exhaust duct 120.

Figure 2:
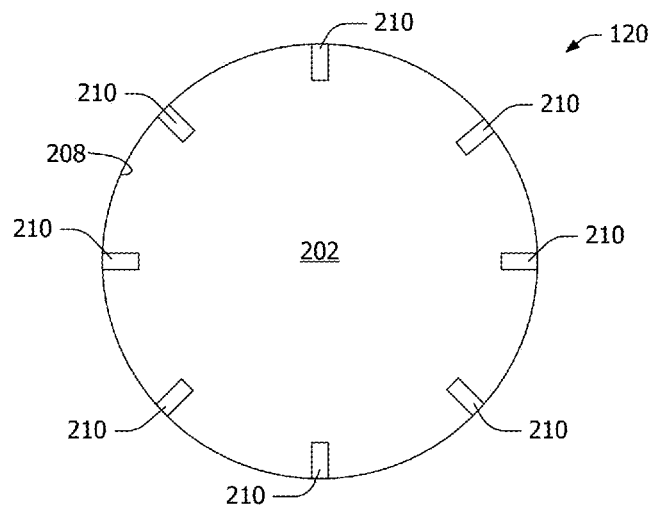
FIG. 2 is a cross-sectional view of the exhaust section shown in FIG. 1.
Figure 3:
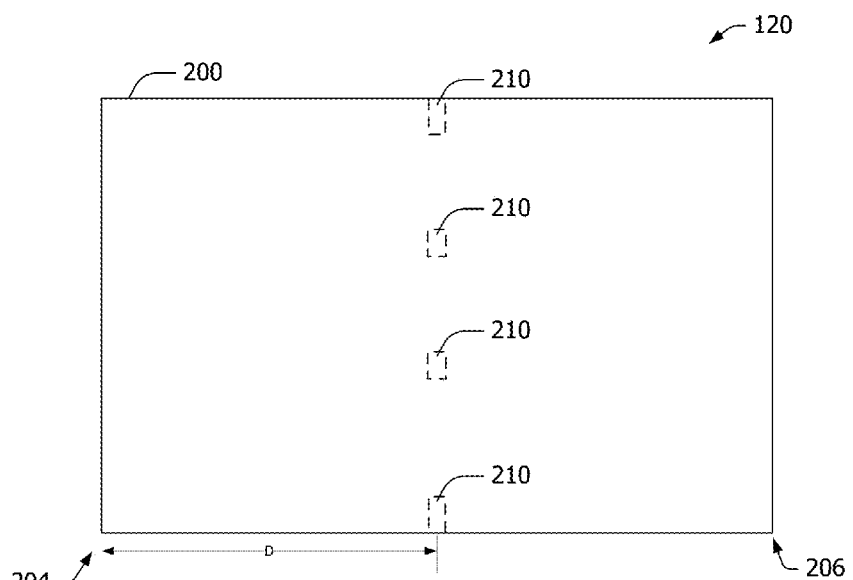
FIG. 3 is an enlarged side view of the exhaust section shown in FIGS. 1 and 2.

FIG. 2 is a cross-sectional view of an exemplary exhaust section 120 taken along line 2-2 (shown in FIG. 1). FIG. 3 is an enlarged side view of exhaust section 120. In the exemplary embodiment, exhaust section 120 includes an axial exhaust duct 200 that defines an exhaust chamber 202. Moreover, in the exemplary embodiment, exhaust duct 200 is substantially cylindrical and includes a first end 204 that is adjacent turbine section 118 (shown in FIG. 1) and a second end 206 that is opposite first end 204. At least one sensor probe 210 is coupled to an inner surface 208 of exhaust duct 200. In the exemplary embodiment, a plurality of sensor probes 210 are spaced about a circumference of exhaust duct 200.

In the exemplary embodiment, sensor probe 210 is any type of sensor capable of measuring emissions including, but not limited to, a continuous emissions monitoring sensor (CEMS) system, a gas analyzer, a gas chromatograph, a lambda meter (oxygen sensor), a tunable diode laser sensor, and/or a zirconia oxygen analyzer. Sensor probe 210 directly measures a concentration of at least one constituent in the exhaust flow including, but not limited to, $NO_x$ (nitrogen oxide), NO (nitric oxide), $NO_2$ (nitrogen dioxide), CO (carbon monoxide), $CO_2$ (carbon dioxide), $O_2$ (oxygen), and/or $N_2$ (nitrogen).

In the exemplary embodiment, sensor probes 210 are installed and located within exhaust duct 200 at a "sweet spot" that represents a well-mixed exhaust flow with respect to temperature. The sweet spot is typically a distance D from first end 204 of exhaust duct 200 and its location varies depending on which specific emissions component is to be monitored.

Figure 4:
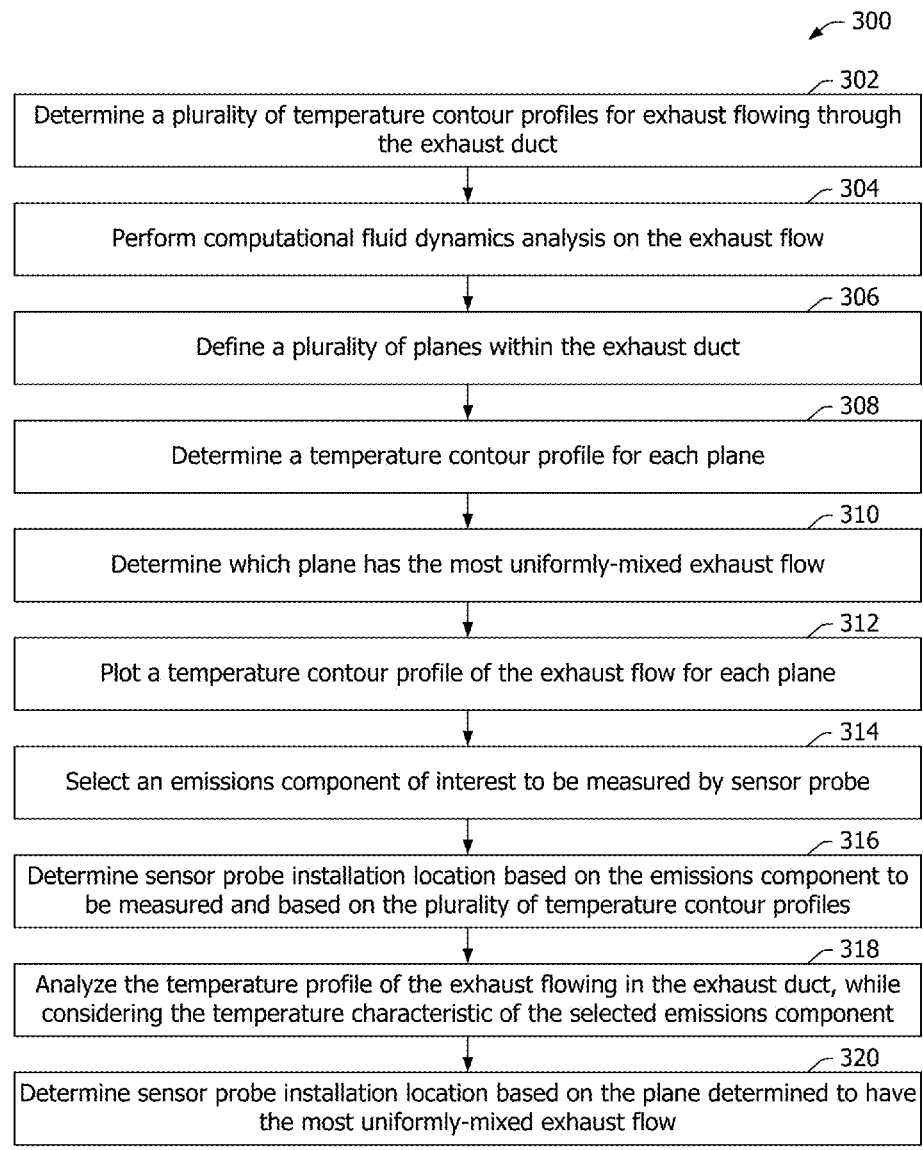
FIG. 4 is a flow chart of an exemplary method of determining a sensor probe location in an exhaust duct of a gas turbine.
Figure 5:
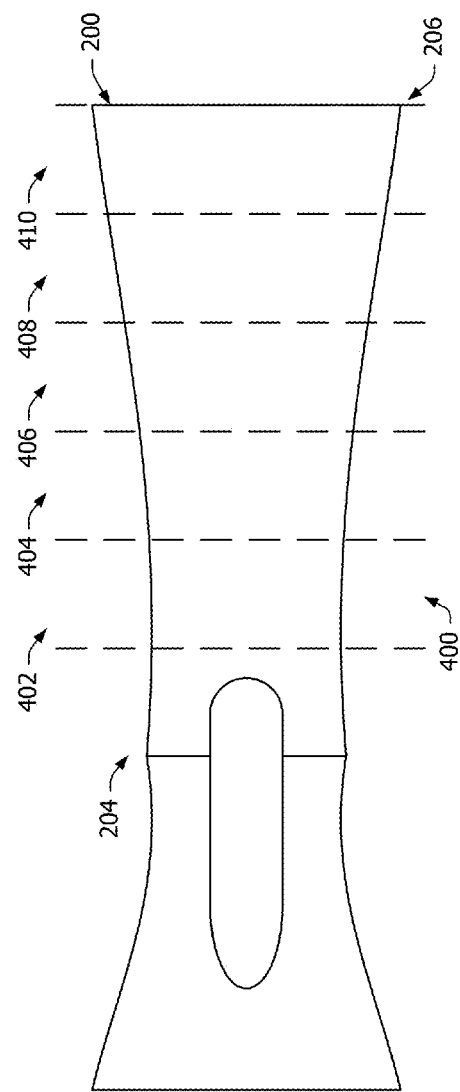
FIG. 5 is a side view of the exhaust duct shown in FIGS. 2 and 3 including a plurality of planes defined therein.
Figure 6:
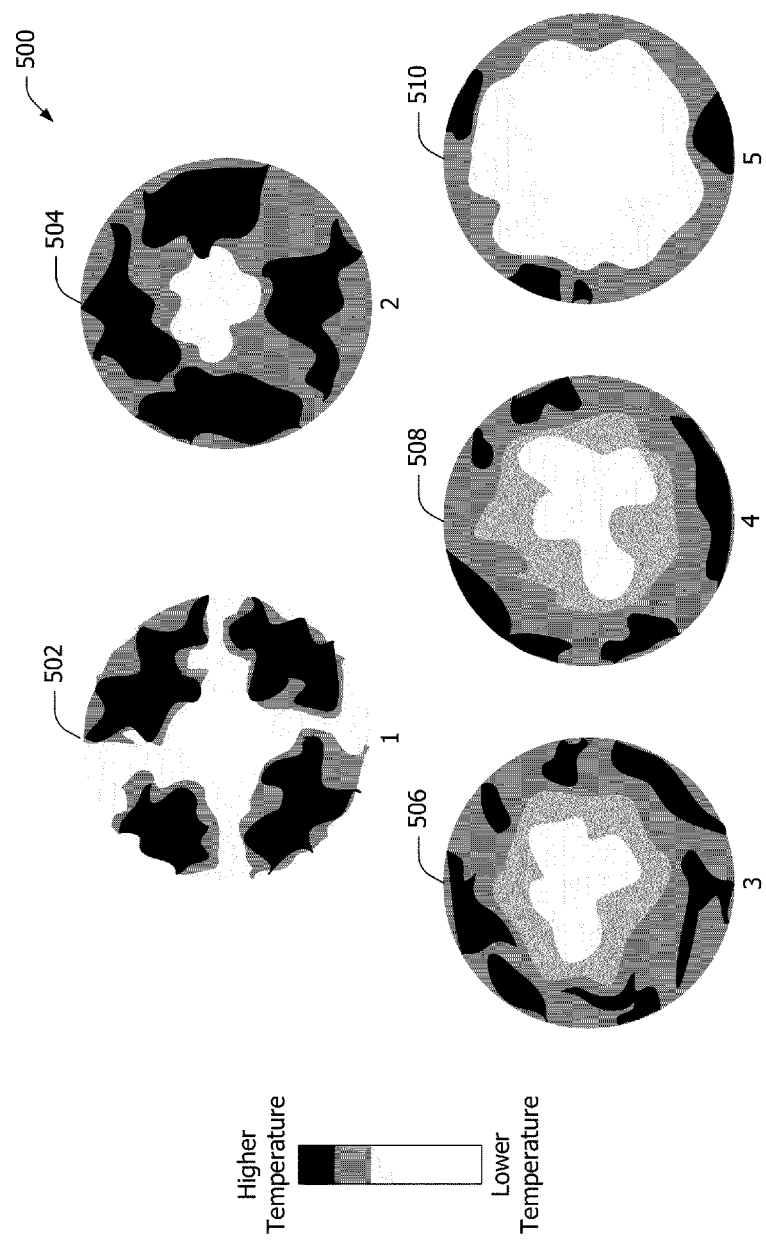
FIG. 6 illustrates exemplary temperature contour profiles of exhaust flowing through an exhaust duct.

FIG. 4 is a flow chart 300 of an exemplary method of determining a sensor probe location in a CLEC system. FIG. 5 is a side view of exhaust duct 200 (shown in FIGS. 2 and 3) and identifies a plurality of planes 400 defined therein. FIG. 6 illustrates exemplary temperature contour profiles of exhaust flowing through exhaust duct 200 shown in FIGS. 2 and 3. The method illustrated in FIG. 4 will be described while referring to FIGS. 5 and 6.

In the exemplary embodiment, the method of determining a sensor probe location includes determining 302 a plurality of temperature contour profiles for exhaust flowing through exhaust duct 200. To determine 302 a plurality of temperature contour profiles, computational fluid dynamics analysis is performed 304 on the exhaust flow. To perform 304 computational fluid dynamics analysis, a plurality of planes 400 are initially defined 306 within exhaust duct 200. A temperature contour profile is determined 308 for each plane 400 defined. More specifically, in the exemplary embodiment, exhaust duct 200 includes a first plane 402, a second plane 404, a third plane 406, a fourth plane 408, and a fifth plane 410. Although five planes 400 are defined in exhaust duct 200, as best seen in FIG. 6, any other number of planes 400 may be defined 306 that enables the method to be performed as described herein. In the exemplary embodiment, planes 400 are axially-spaced relative to a longitudinal axis extending from first end 204 to second end 206. Planes 400 are axially-spaced a predetermined distance from each other from first end 204 to second end 206. The temperature contour profiles at each plane 400 are analyzed to determine 310 which plane 400 has the most uniformly-mixed exhaust flow.

In the exemplary embodiment, determining 302 temperature contour profiles also includes plotting 312 a temperature contour profile of the exhaust flow for each plane 402, 404, 406, 408, and 410. FIG. 6 illustrates a plurality of temperature contour profiles 500 associated with planes 402, 404, 406, 408, and 410. More specifically, in the exemplary embodiment, a first temperature contour profile 502 illustrates a temperature profile at first plane 402, a second temperature contour profile 504 illustrates a temperature profile at second plane 404, a third temperature contour profile 506 illustrates a temperature profile at third plane 406, a fourth temperature contour profile 508 illustrates a temperature profile at fourth plane 408, and a fifth temperature contour profile 510 illustrates a temperature profile at fifth plane 410. The temperature profile of the exhaust flow becomes increasingly well-mixed as the exhaust flow through exhaust duct 200 flows from first end 204 towards second end 206. A well-mixed temperature profile empirically correlates to a well-mixed exhaust composition.

In the exemplary embodiment, the method also includes selecting 314 an emissions component of interest to be measured by sensor probe 200. As described above, there are numerous components that can be measured. The emissions component to be measured includes at least one of nitrogen oxide, nitric oxide, nitrogen dioxide, carbon monoxide, carbon dioxide, oxygen, and nitrogen.

In the exemplary embodiment, the method includes determining 318 sensor probe 210 installation location based on the emissions exhaust component or constituent to be measured and based on the plurality of temperature contour profiles. Each particular exhaust component has a known empirical relationship with temperature. More specifically, each exhaust component has a known temperature characteristic wherein the concentration of a particular component may increase or decrease with respect to an increase or decrease in temperature. By analyzing 318 the temperature profile of the exhaust flowing through exhaust duct 200, while taking into account the temperature characteristic of the defined component, a prediction can be made as to the region of exhaust duct 200 that may contain the highest concentration of that particular exhaust component.

In the exemplary embodiment, sensor probe 210 installation location is also determined 320 based on the determination 310 of which plane 400 has the most uniformly-mixed exhaust flow. More specifically, an installation distance of sensor probe 210 relative to first end 204 of exhaust duct 200 is determined based on the plane 400 determined 310 to have the most uniformly-mixed exhaust flow. In the exemplary embodiment, fifth plane 410 is selected as the installation location because plane 410 is determined 310 to have the exhaust profile containing the most-effectively mixed exhaust flow with respect to the temperature profile.

In the exemplary embodiment, a depth at which sensor probe 210 is installed in exhaust duct 200 is also determined More specifically, sensor probe 210 is positioned a radial distance from longitudinal axis of exhaust duct 200. In the exemplary embodiment, probes 210 have an extendible insertion depth of between about 12" to about 24". However, in alternative embodiments, probes 210 may have any insertion depth that enables probes 210 to function as described herein. In the exemplary embodiment, the extension ability enables probe 210 to compensate for any inaccuracy in the temperature contour profile results.

In the exemplary embodiment, $NO_x$ is specified as the component of interest. In this example, a CLEC system is used to enable combustor section 116 (shown in FIG. 1) to operate as closely as possible to a performance guarantee emissions boundary of about 9 parts per million (ppm) of $NO_x$. At lower temperatures, $NO_x$ has a tendency to dissolve with existing water vapor, or react with other chemicals, which reduces the effective concentration of $NO_x$. As the temperature increases, the concentration of $NO_x$ increases. Therefore, for a better gage repeatability and reproducibility (R&R) and to gain margin in operability, sensor probes 210 should be located in the higher temperature regions of the temperature contour plots, i.e., in the exemplary embodiment, fifth plane 410. With this design, if the CLEC system NO measurements are consistently higher than NO measurements at exit stack 134 (shown in FIG. 1), then as long as fuel splits and/or gas turbine operation are adjusted to maintain a rolling average $NO_x$ concentration of about 9 ppm or less at the CLEC system location, the readings at the stack should always be within the EPA regulations.

In an alternative example, a CLEC system is designed to regulate carbon monoxide (CO) levels at a turbine minimum-turndown condition. In contrast to the temperature-concentration characteristics of $NO_x$, CO generally has a higher concentration at lower exhaust temperatures. There is an empirical correlation that CO is a predominant exhaust component in lower temperature regions. Based on temperature contour profiles shown in FIG. 6, sensor probes 210 should be positioned near first end 204 of exhaust duct 200 to get into the cooler spots identified by the temperature contour profiles. The method of determining a sensor probe location can be directly applied to any CLEC system design problem for an axial exhaust configuration for any emissions component of interest.

Figure 7:
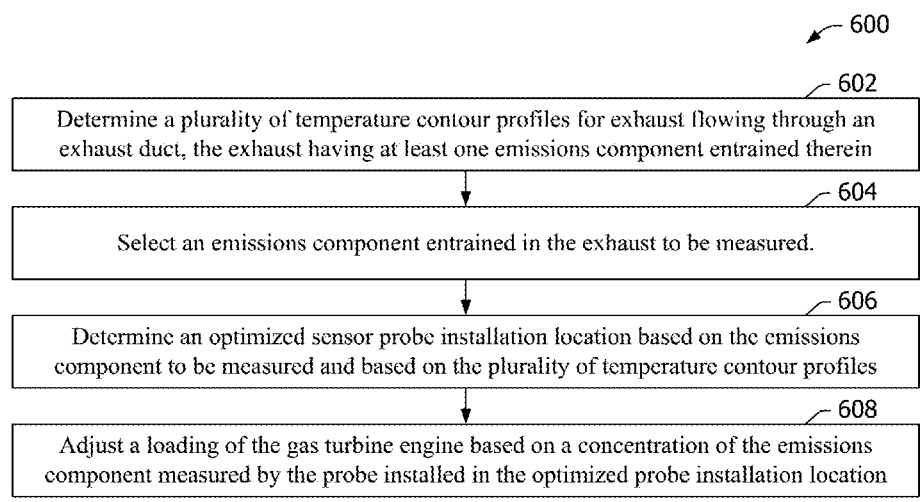
FIG. 7 is a flow chart of an exemplary method of operating a gas turbine engine.

FIG. 7 is a flow chart 600 of an exemplary method of operating a gas turbine engine. The method includes determining 602 a plurality of temperature contour profiles for exhaust flowing through an exhaust duct, the exhaust having at least one emissions component entrained therein. An emissions component entrained in the exhaust to be measured is then selected 604. The method then includes determining 606 an desired sensor probe installation location based on the emissions component to be measured and based on the plurality of temperature contour profiles. A loading and/or operation of the gas turbine engine is then adjusted 608 based on a concentration of the emissions component measured by the sensor probe installed in the optimized sensor probe installation location.

The methods of determining a sensor probe location described herein facilitate determining a desired sensor probe position within an axial-exhaust gas turbine engine. More specifically, the methods described herein determine an desired sensor probe installation location based on an emissions component to be measured and based on a plurality of temperature contour profiles. As such, the methods reduce time and costs associated with installing sensor probes. Moreover, the safety of field workers installing the sensor probes is increased by the reduction in installation time.

A technical effect of the methods described herein may include at least one of: (a) determining, at different locations, a plurality of temperature contour profiles for exhaust flowing through an exhaust duct; (b) selecting an emissions component entrained in the exhaust to be measured; and (c) determining a desired sensor probe installation location based on the emissions component to be measured and based on the plurality of temperature contour profiles.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of determining a desired sensor probe location in a closed loop emissions control (CLEC) system of a gas turbine engine, said method comprising:
    determining a plurality of temperature contour profiles for exhaust flowing through an exhaust duct, wherein each temperature contour profile includes a plurality of temperatures at a plurality of locations within a corresponding plane of a plurality of planes of the exhaust duct;
    selecting an emissions component entrained in the exhaust to be measured; and
    determining, based on the emissions component to be measured and based on the plurality of temperature contour profiles, at least one of an axial location along the exhaust duct and a radial depth within the exhaust duct for insertion of a sensor probe.

2. The method in accordance with claim 1, wherein selecting a sensor probe installation location further comprises:
    determining a temperature contour profile of the plurality of temperature contour profiles that has the most uniformly-mixed flow of exhaust; and
    determining the sensor probe installation location based on the emissions component to be measured and the temperature contour profile determined to have the most uniformly-mixed exhaust flow.

3. The method in accordance with claim 1, wherein determining a sensor probe installation location further comprises determining the sensor probe installation location based on a temperature characteristic of the emissions component to be measured and the plurality of temperature contour profiles.

4. The method in accordance with claim 3, wherein the temperature characteristic of the emissions component to be measured is a concentration of the emissions component to be measured relative to a temperature of the exhaust flow.

5. The method in accordance with claim 1, wherein determining a plurality of temperature contour profiles comprises performing computational fluid dynamics analysis on the exhaust flow.

6. The method in accordance with claim 1, wherein determining a plurality of temperature contour profiles comprises:
    defining a plurality of planes within the exhaust duct; and
    determining a temperature contour profile for each plane of the plurality of planes.

7. The method in accordance with claim 6, further comprising determining the sensor probe installation location based on the emissions component to be measured and a plane of the plurality of planes determined to have the most uniformly-mixed exhaust flow.

8. The method in accordance with claim 6, wherein defining a plurality of planes comprises defining a plurality of axially-spaced planes relative to a longitudinal axis from a first end of the exhaust duct to a second end of the exhaust duct.

9. The method in accordance with claim 8, further comprising spacing the plurality of axially-spaced planes a distance from one another from a first end of the exhaust duct to a second end of the exhaust duct.

10. The method in accordance with claim 9, further comprising:
determining a plane of the plurality of planes having the most uniformly-mixed exhaust flow; and
determining a distance from the first end of the exhaust duct at which to install the sensor probe based on the plane determined to have the most uniformly-mixed exhaust flow.

11. The method in accordance with claim 10, wherein the exhaust duct is cylindrical, further comprising determining a radial distance from a central longitudinal axis of the exhaust duct at which to install the sensor probe.

12. The method in accordance with claim 1, wherein the exhaust duct is cylindrical, selecting a sensor probe installation location further comprises determining the sensor probe installation location for a plurality of sensor probes equally spaced about an inner circumference of the exhaust duct.

13. The method in accordance with claim 1, wherein selecting an emissions component comprises selecting at least one of nitrogen oxide, nitric oxide, nitrogen dioxide, carbon monoxide, carbon dioxide, oxygen, and nitrogen.

14. A method of operating a gas turbine engine, said method comprising:
determining a plurality of temperature contour profiles for exhaust flowing through an exhaust duct, wherein each temperature contour profile includes a plurality of temperatures at a plurality of locations within a corresponding plane of a plurality of planes of the exhaust duct, the exhaust having at least one emissions component entrained therein;
selecting an emissions component entrained in the exhaust to be measured;
determining, based on the emissions component to be measured and based on the plurality of temperature contour profiles, at least one of an axial location along the exhaust duct and a radial depth within the exhaust duct for insertion of a sensor probe; and
adjusting at least one of a loading and operation of the gas turbine engine based on a concentration of the emissions component measured by the sensor probe inserted within the exhaust duct.

15. The method in accordance with claim 14, wherein selecting a sensor probe installation location further comprises:
determining a temperature contour profile of the plurality of temperature contour profiles that has the most uniformly-mixed flow of exhaust; and
determining the sensor probe installation location based on the emissions component to be measured and the temperature contour profile determined to have the most uniformly-mixed exhaust flow.

16. The method in accordance with claim 14, wherein determining a sensor probe installation location further comprises determining the sensor probe installation location based on a temperature characteristic of the emissions component to be measured and the plurality of temperature contour profiles.

17. The method in accordance with claim 14, wherein determining a plurality of temperature contour profiles comprises:
defining a plurality of planes within the exhaust duct; and
determining a temperature contour profile for each plane of the plurality of planes.

18. The method in accordance with claim 17, further comprising determining the sensor probe installation location based on the emissions component to be measured and a plane of the plurality of planes determined to have the most uniformly-mixed exhaust flow.

19. The method in accordance with claim 17, wherein defining a plurality of planes comprises defining a plurality of axially-spaced planes relative to a longitudinal axis from a first end of the exhaust duct to a second end of the exhaust duct.

20. The method in accordance with claim 19, further comprising:
spacing the plurality of axially-spaced planes a distance from one another from a first end of the exhaust duct to a second end of the exhaust duct;
determining a plane of the plurality of planes having the most uniformly-mixed exhaust flow; and
determining a distance from the first end of the exhaust duct at which to install the sensor probe based on the plane determined to have the most uniformly-mixed exhaust flow.

* * * * *

UNITED STATES PATENT AND TRADEMARK OFFICE
CERTIFICATE OF CORRECTION

PATENT NO. : 9,745,900 B2
APPLICATION NO. : 14/265658
DATED : August 29, 2017
INVENTOR(S) : Siddharth Aphale et al.

Page 1 of 1

It is certified that error appears in the above-identified patent and that said Letters Patent is hereby corrected as shown below:

In the Specification

Column 5, Lines 15-16, delete "NO measurements are consistently higher than NO measurements" and insert therefor -- $NO_x$ measurements are consistently higher than $NO_x$ measurements --.

Signed and Sealed this
Nineteenth Day of February, 2019

Andrei Iancu
*Director of the United States Patent and Trademark Office*